April 10, 1962    D. ROBERTSON    3,028,947
CONVEYING APPARATUS
Filed Dec. 5, 1960    2 Sheets-Sheet 2
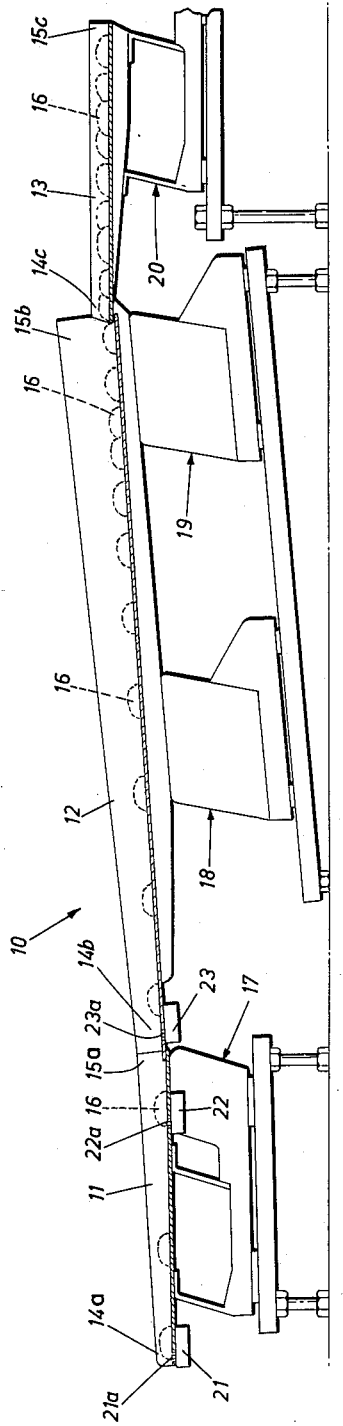
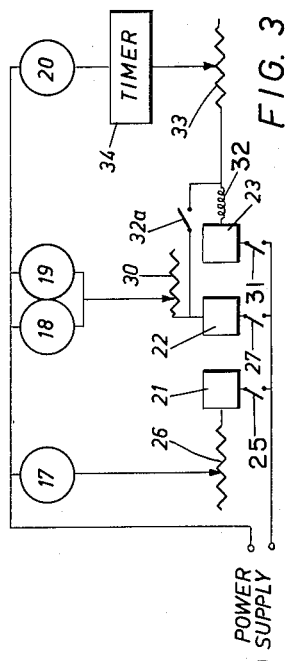
Douglas Robertson
Inventor
by: Ronald F. Sim
Attorney United States Patent Office 3,028,947
Patented Apr. 10, 1962

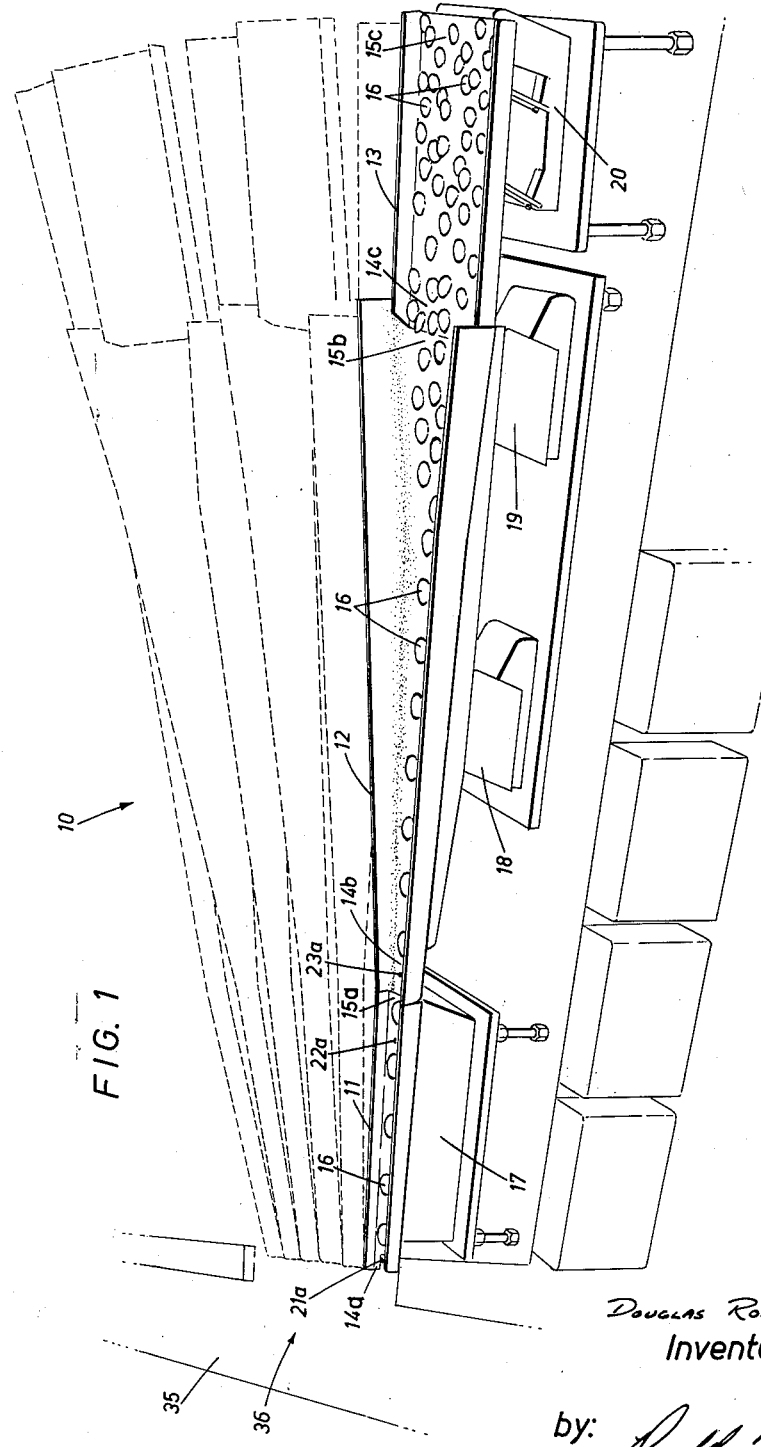

3,028,947
CONVEYING APPARATUS
Douglas Robertson, Toronto, Ontario, Canada, assignor to The Rowntree Company Limited, Toronto, Ontario, Canada
Filed Dec. 5, 1960, Ser. No. 73,584
12 Claims. (Cl. 198—37)

This invention relates to conveying apparatus. More particularly, this invention relates to conveying apparatus of the vibrating type, as contrasted to the moving belt or moving container type. Still more particularly, this invention relates to vibratory conveying apparatus particularly suitable for use in connection with the conveying of articles which may be readily bruised, such as sweets, fruit and vegetables, for example.

As is well known, there are two basic types of conveyors, namely moving belt or moving container type conveyors and vibratory type conveyors. My invention relates to conveyors of the latter type.

Conveyors of both types have advantages and disadvantages, but it is not my intention to enumerate these, as such would serve no useful purpose in describing my invention. It is sufficient to say that it has not been generally practical, for reasons to be hereinafter mentioned, to employ vibratory type conveyors for the conveying of articles which are easily bruised, this being true even when, in other respects, it would be clearly more desirable to employ a vibratory type conveyor than a belt type conveyor.

It is, accordingly, an important object of my invention to provide vibratory type conveying apparatus which may be employed for the conveying of bruisable articles with a minimum amount of bruising.

It will be appreciated that where a conveyor is employed so as to deliver a plurality of articles at a discharge point, depending on the particular application, it may be necessary for the conveyor to deliver the articles one at a time at this point. This mode of operation has been achieved with belt type conveyors by the use of mechanical stops which cause the articles to pile up behind them, the stops operating to dispense one article at a time to the discharge point. A similar mode of operation may be employed with vibratory type conveyors. Where a vibratory type conveyor is in continuous operation, however, and readily bruisable articles are being conveyed, it is not feasible to employ such mechanical stops, or any other means which cause the articles to pile up behind a station from which they are individually dispensed. The reason for this is that the articles piled up and in contact with each other at the station are continuously subjected to vibration and consequent cumulative bruising while at the station. It will be apparent, therefore, that it would be desirable to provide a vibratory type conveyor, the vibrations of which are all utilized in only the transportation of articles to a discharge point.

It is, therefore, another important object of my invention to provide an efficient vibratory type conveyor for transporting bruisable articles, the conveyor vibrating only when necessary for the transportation of the articles.

Yet another object of my invention is to provide a vibratory type conveyor which is inactivated when an article transported by the conveyor is in a predetermined position.

It will be appreciated that where articles from a conveyor are to be picked up, either manually or with automatic equipment, it is desirable that the conveyor should stop if the operator or the machine ceases picking up the articles. This is particularly true where the conveyor is of the vibratory type and the articles are bruisable, since the articles would pile up and be subjected to vibration other than that necessary to transport the articles.

Accordingly, a further object of my invention is to provide a vibratory type conveyor which automatically ceases to vibrate when articles are not removed from the discharge end thereof.

It is a common complaint with conveyors that transport large numbers of articles that the articles, at one time or another, jam together.

Another object of my invention is to provide a conveyor which is constructed of a number of sections which may be independently vibrated, the conveyor being designed to minimize the tendency for articles to jam together.

In brief, a preferred embodiment of conveying apparatus for articles constructed in accordance with my invention comprises a plurality of conveyor sections disposed one with another in article transfer relationship. A plurality of vibrating means individually vibrate each conveyor section independently of each other conveyor section. In order to inactivate the vibrating means, control means responsive to articles being conveyed by the apparatus assuming predetermined positions are provided.

Other objects and further advantages of apparatus embodying my invention will become apparent from the following disclosure taken in conjunction with the drawings, in which:

FIGURE 1 is a side view, in perspective, of one embodiment of my invention, five of the six conveyors being shown in ghost outlines;

FIGURE 2 is a side elevation, partly in section, of the conveyor shown in solid outlines in FIGURE 1; and FIGURE 3 illustrates a control circuit for apparatus embodying my invention.

While, in the following detailed description, I will disclose my invention in connection with the conveying of sweets, namely chocolates, it will be appreciated that my invention is in no way limited thereto. While my apparatus is particularly suitable for the transportation of bruisable articles, my invention may be applied with certain advantages to the conveying of any articles.

Referring now to the drawings, and in particular to FIGURES 1 and 2, for a more detailed description of a preferred embodiment of apparatus constructed in accordance with my invention, I have shown six, generally trough-shaped conveyors 10, only one of which is illustrated in detail. All of these conveyors are identical, as are their vibrating and control mechanisms, and hence only one conveyor need be described.

Conveyor 10 is divided into three independent sections, a discharge section 11, an intermediate section 12 and a loading section 13. The conveyor sections have discharge ends 14a, 14b and 14c respectively and loading ends 15a, 15b and 15c respectively. The conveyor sections are disposed one with another in article transfer relationship, discharge end 14c of loading section 13 being adjacent loading end 15b of intermediate section 12, and discharge end 14b of intermediate section 12 being adjacent loading end 15a of discharge section 11. It is preferable, though not essential, that section 12 be slightly inclined downwardly with respect to the horizontal as shown, while sections 11 and 13 are about horizontal. A plurality of articles 16, in this case chocolates, are positioned in conveyor 10 for transportation from loading section 13 to discharge section 11. The conveyor sections are generally funnel shaped in plan, the breadth decreasing from loading end to discharge end of the conveyor.

Means are provided for independently vibrating each conveyor section. In the embodiment of my invention shown, these means comprise vibrators 17, 18, 19 and 20 suitably connected to the conveyor sections, vibrator 17 being adapted to impart vibration to discharge section 11, vibrators 18 and 19 operating in synchronism and being adapted to impart vibration to intermediate section 12, and vibrator 20 being adapted to impart vibration to loading section 13. It will be appreciated that one of vibrators 18 or 19 may be deleted and replaced by a suitable spring arm support which functions so as to support conveyor section 12 and yet permits section 12 to be suitably vibrated by the remaining vibrator.

It should be noted at this point that means for vibrating conveyors are well known and, per se, form no part of my invention. Numerous devices, all known in the art, may be employed without departing from my invention. In an embodiment of my invention which has been constructed and successfully operated, I employed vibrators marketed under the trademark "Syntron". Vibrators 17 and 20 were rated at 0.35 amp, 115 volts A.C., vibrators 18 and 19 being rated at 0.70 amp, 115 volts A.C.

Positioned under the conveyor sections adjacent discharge end 14a of discharge section 11, loading end 15a of discharge section 11 and discharge end 14b of intermediate section 12 are micro-switches 21, 22 and 23. The trip arms 21a, 22a and 23a of the microswitches 21, 22 and 23 respectively extend through small slots in the bases of the conveyor sections 11 and 12 and are adapted to be tripped by articles 16 as they pass thereover. It will be noted, however, that the trip arms are of such a length and are so positioned that they in no way impede the motion of articles 16 along the conveyor.

As will become more apparent hereinafter, microswitches 21, 22 and 23 serve as article sensing means. Many other types of article sensing means well-known in the art may be employed without departing from my invention. For instance, photo-electric cells may be employed. In this case, the photoelectric cells may be positioned under the conveyor sections, and light sources may be positioned above the conveyor sections, light from the light sources being directed on the photocells through slots in the bases of the conveyor sections. Under these conditions there would be an electrical output from the photocells. As soon as an article blocked off a slot, the photocell under the slot would be rendered inactive. The presence or absence of an electrical output from the photocells may be used to control the vibration of a conveyor section, as will become more apparent hereinafter. As mentioned, other article sensing means may be employed as well.

As will become apparent, microswitch 21 is a part of a control circuit which is connected to and controls vibrator 17. Microswitches 22 and 23 are parts of a control circuit which is connected to and controls vibrators 18, 19 and 20. These control circuits are shown in FIGURE 3. As shown in this figure, one contact of microswitch 21 is connected to one side of any suitable power supply (not shown) through a manually operated switch 25. The other side of microswitch 21 is connected through a variable resistor 26 to vibrator 17, the vibrator being connected to the other side of the power supply to complete the circuit. Referring to the other control circuit shown in the figure, one contact of microswitch 22 is connected through a manually operated switch 27 to one side of the power supply. The other contact of microswitch 22 connects through a variable resistor 30 to one side of vibrators 18 and 19 respectively. This circuit is completed by a connection between the other side of vibrators 18 and 19 and the other side of the power supply. Microswitch 23 has one contact thereof connected to one side of the power supply through a manually operated switch 31. The other contact of microswitch 23 is connected through the coil 32 of a relay, a variable resistor 33, a timer 34 and vibrator 20 to the other side of the power supply. The normally open contacts 32a of the relay are connected between one end of coil 32 and one end of resistor 30.

In the operation of the embodiment of my invention illustrated, trays containing a large number of articles 16, e.g. chocolates, are placed on each of the six loading sections 13. The chocolates on any one tray are identical but may differ from the chocolates on any other tray. The conveying apparatus is started by closing switches 25, 27 and 31, thereby activating vibrators 17, 18 and 19. Timer 34 is set so that it is off for about five periods and on for about one period. Timer 34 is a gate and permits operation of vibrator 20 only during this one period, and only provided that microswitch 23 is closed, of course. At start-up all the microswitches are closed since this is their normal position. Thus, during start-up, loading section 13 is vibrated only during one period and is off for five periods. In the particular application under consideration, this is necessary in order to prevent jamming of the articles. This can be seen from the fact that there are a large number of articles ready to be discharged from discharge end 14c of loading section 13 at any one time, but it is desired that these articles should appear one at a time at discharge end 14a of discharge section 11, and that these articles should be spaced out and not be piled up one behind another. The opposite of this condition would be true if all conveyor sections 11, 12 and 13 were continuously vibrated with vibrations of the same amplitude, thereby discharging continuously a relatively large number of chocolates on loading end 15b of intermediate section 12. Obviously under such conditions the chocolates would pile up or jam because of the decreasing breadth of each conveyor section from the discharge end 14c of loading section 13 (maximum breadth) to the discharge end 14a of the discharge section 11 (minimum breadth). This problem also could be obviated by continuous operation of all conveyor sections, conveyor section 11 being imparted vibrations of greater amplitude than conveyor section 12, and conveyor section 13 being imparted vibrations of the smallest amplitude.

Vibration of the conveyor sections and consequent transportation of the chocolates from one end of the conveyor to the other will continue until a chocolate trips and opens microswitch 21, although intermediate section 12 would stop momentarily in the interim if chocolates tripped microswitches 22 and 23 at the same time. This would only be a momentary stoppage, however, as the vibration of discharge section 11 would soon cause the chocolate that tripped microswitch 22 to move on towards discharge end 14a of discharge section 11, thereby permitting microswitch 22 to reclose.

When a chocolate trips and opens microswitch 21, vibrator 17 is inactivated, and vibration of discharge section 11 ceases. At this point there may or may not be chocolates tripping microswitches 22 and 23. If both these switches are tripped at this point, intermediate section 12 will cease vibration as a result of the opening of switches 22 and 23 and consequent de-energization of vibrators 18 and 19. If loading section 13 was vibrating at this time, i.e. the circuit through timer 34 was closed, loading section 13 also would stop vibrating as a result of the opening of microswitch 23 and consequent de-energization of vibrator 20.

If, at the inactivation of vibrator 17, microswitch 22, but not microswitch 23 is tripped, vibration of intermediate section 12 will continue, as the current passing through relay coil 32 when timer 34 was closed will have caused contacts 32a to close, thereby maintaining a complete circuit through vibrators 18 and 19. Loading section 13 may or may not be vibrating at this time depending on the condition of timer 34. Vibration of intermediate section 12 and, if it is vibrating, loading section 13, will cease when microswitch 23 is tripped, as it will be by a chocolate being transported down this section.

If, at the time of inactivation of vibrator 17, microswitch 23, but not microswitch 22 is tripped, vibration of intermediate section 12 will continue, though vibration of loading section 13 will be prevented because of the opening of microswitch 23, which, incidentally, opens relay contacts 32a. Vibration of intermediate section 12 eventually will cause a chocolate to be discharged from discharge end 14b of intermediate section 12 onto loading end 15a of discharge section 11, whereupon microswitch 22 will be tripped. The same conditions now exist as were discussed in the previous paragraph, i.e. either both microswitches 22 and 23 will be tripped at this point, or only microswitch 22 will be tripped. In the first case conveyor section 12 and, if it is vibrating, conveyor section 13 will cease vibrating immediately. In the latter case, vibration will cease in a short time.

Thus it will be seen that eventually a condition will exist such that no conveyor sections are vibrating, the chocolates are spread out relatively evenly, and a chocolate is tripping each of microswitches 21, 22 and 23.

Upon removal of the chocolate which is tripping microswitch 21, which removal may be effected manually or by automatic or semi-automatic equipment, microswitch 21 is reclosed, thereby initiating vibration of discharge section 11. This in turn causes the chocolate which is tripping microswitch 22 to move down discharge section 11, thereby initiating vibration of intermediate section 12 and causing the chocolate which is tripping microswitch 23 to move on down the conveyor. Loading section 13 will commence vibrating when switch 23 is closed and timer 34 closes the circuit to the power supply. As soon as another chocolate trips microswitch 21, the aforementioned operation will be repeated. At any time the intensity of the vibrational output of vibrators 17, 18, 19 and 20 may be varied by adjustment of resistors 26, 30 and 33.

It will be apparent from a consideration of the foregoing that I have provided apparatus of the vibratory conveyor type which possesses many distinct advantages. Some of the most important of these are the ability to transport bruisable articles with a minimum amount of bruising, and the ability to shut off vibrations completely when articles are in predetermined positions, and hence to prevent piling up of articles.

The embodiment of my invention which has been illustrated and described is particularly suitable for use in connection with the packaging of chocolates. In this particular case six chocolates are to be packaged in one of four rows of six in a chocolate box (not shown). The empty chocolate boxes may be fed on a conveyor belt 35 running transverse to conveyor 10 to and past a loading station 36 at the discharge end of discharge sections 11. Assuming that the chocolates are to be packaged manually, an operator seated at loading station 36 places the six chocolates removed from discharge ends 14a of discharge sections 11 in the designated row in the box. This chocolate box then is passed on conveyor belt 35 to three other loading stations, each being at the terminus of three apparatuses identical to that described. At these three other stations the three empty rows of six in the box are filled. Every time a chocolate is removed from discharge ends 14a of discharge sections 11, it is replaced in the manner previously indicated. As aforementioned, automatic or semi-automatic loading equipment may be employed.

It will be appreciated, that, while I have described apparatus embodying my invention in connection with the packaging of chocolates, my apparatus has many other applications both within and without the confectionery industry. For example, a common operation in the confectionery industry is the placing of solid centres in a chocolate shell which is contained in a metal or plastic mould. This operation is very often performed by hand. It will be quite apparent that apparatus embodying my invention can be of considerable advantage in facilitating this operation. As an example of a non-confectionery industry application, in the assembly of, for example, radio and television receivers in the electronic industry, it is often necessary for components such as nuts, bolts and washers, or resistors, capacitors and inductors to be assembled in a predetermined sequence. Obviously apparatus embodying my invention may be used to advantage in such an application. Those skilled in the art will undoubtedly be aware of numerous other applications for conveying apparatus embodying my invention.

While I have described in detail the structure and operation of a preferred embodiment of apparatus constructed and operated in accordance with my invention, those skilled in the art will realize that many modifications, alterations and changes may be made therein without departing from the spirit and scope of my invention as defined in the appended claims.

What I claim as my invention is:

1. Conveying apparatus for articles comprising at least a pair of conveyor sections disposed one with another in article transfer relationship, each of said conveyor sections having a discharge end and a loading end, the loading end of one conveyor section being adjacent the discharge end of the other conveyor section, at least first and second vibrating means for vibrating each conveyor section independently of each other conveyor section, said first vibrating means being adapted to vibrate said one conveyor section, said second vibrating means being adapted to vibrate said other conveyor section, and at least first, second and third control means including first, second and third article sensing means respectively for sensing said articles, said first article sensing means being positioned adjacent the discharge end of said one conveyor section, said second article sensing means being positioned between said first article sensing means and the loading end of said one conveyor section, said third article sensing means being positioned between the loading end and discharge end of said other conveyor section, said first control means being adapted to inactivate said first vibrating means upon sensing of an article by said first sensing means, said second and third control means being adapted to inactivate said second vibrating means upon concurrent sensing of articles by said second and third sensing means.

2. Apparatus according to claim 1 wherein said second sensing means is positioned adjacent said loading end of said one conveyor section and said third sensing means is positioned adjacent said discharge end of said other conveyor section.

3. Conveying apparatus for articles comprising a discharge conveyor section, an intermediate conveyor section and a loading conveyor section disposed one with another in article transfer relationship, each of said conveyor sections having a loading end and a discharge end, the loading end of said intermediate conveyor section being positioned adjacent the discharge end of said loading conveyor section, the discharge end of said intermediate conveyor section being positioned adjacent the loading end of said discharge conveyor section, first, second and third vibrating means, said first vibrating means being adapted to vibrate said loading conveyor section, said second vibrating means being adapted to vibrate said intermediate conveyor section, said third vibrating means being adapted to vibrate said discharge conveyor section, first control means including first article sensing means for sensing said articles and positioned adjacent said discharge end of said discharge conveyor section, said first control means being adapted to inactivate said third vibrating means upon sensing of an article by said first article sensing means, second control means including second article sensing means for sensing said articles and positioned adjacent said loading end of said discharge conveyor section, and third control means including third article sensing means for sensing said articles and positioned adjacent said discharge end of said intermediate conveyor section, said second and third control means being adapted to inactivate said second vibrating means upon concurrent sensing of an article by said second and third article sensing means, said third control means being adapted to inactivate said first vibrating means upon sensing of an article by said third article sensing means.

4. Apparatus according to claim 3 wherein said first, second and third sensing means are microswitches.

5. Apparatus according to claim 3 including means for varying the intensity of the vibrational output of said vibrating means.

6. Apparatus according to claim 3 wherein said third control means includes timing means permitting inactivation of said first vibrating means only upon sensing of an article by said third article sensing means when said timing means is on, said timing means being off for a longer period that said timing means is on, whereby said first vibrating means is inactivated for longer periods than either said second or said third vibrating means.

7. Conveying apparatus for articles comprising a discharge conveyor section, an intermediate conveyor section and a loading conveyor section disposed one with another in article transfer relationship, each of said conveyor sections having a loading end and a discharge end, the loading end of said intermediate conveyor section being positioned adjacent the discharge end of said loading conveyor section, the discharge end of said intermediate conveyor section being positioned adjacent the loading end of said discharge conveyor section, first, second and third vibrating means, said first vibrating means being adapted to vibrate said loading conveyor section, said second vibrating means being adapted to vibrate said intermediate conveyor section, said third vibrating means being adapted to vibrate said discharge conveyor section, first control means including first article sensing means for sensing said articles and positioned adjacent said discharge end of said discharge conveyor section, said first control means being adapted to inactivate said third vibrating means upon sensing of an article by said first article sensing means, second control means for sensing said articles and positioned between said first article sensing means and said loading end of said discharge conveyor section, and third control means including third article sensing means for sensing said articles and positioned between the discharge end and loading end of said intermediate conveyor section, said second and third control means being adapted to inactivate said second vibrating means upon concurrent sensing of an article by said second and third article sensing means, said third control means being adapted to inactivate said first vibrating means upon sensing of an article by said third article sensing means.

8. Conveying apparatus for articles comprising a discharge conveyor section and at least one other conveyor section, said conveyor sections being disposed one with another in article transfer relationship, each of said conveyor sections having a discharge end and a loading end, the loading end of said discharge conveyor section being adjacent the discharge end of said one other conveyor section, at least first and second vibrating means for vibrating said discharge and said one other conveyor sections respectively independently of each other, at least first and second control circuits, and at least first and second article sensing means for sensing said articles, said first article sensing means being positioned adjacent the discharge end of said discharge conveyor section, said second article sensing means being positioned between said first article sensing means and said loading end of said discharge conveyor section, said first control circuit including said first vibrating means and said first article sensing means and being adapted to be opened and to inactivate said first vibrating means upon sensing of an article by said first article sensing means, said second control circuit including said second vibrating means and said second article sensing means and being adapted to be opened upon sensing of an article by said second article sensing means.

9. Conveying apparatus according to claim 8 wherein said first and second sensing means are microswitches.

10. Conveying apparatus according to claim 8 including a third conveyor section disposed in article transfer relationship with said one other conveyor section, said third conveyor section having a discharge end adjacent the loading end of said one other conveyor section, third vibrating means for vibrating said third conveyor section independently of said discharge and said one other conveyor sections, a third control circuit, and third article sensing means for sensing said articles, said third article sensing means being positioned between said loading and discharge ends of said one other conveyor section, said third control circuit including said third vibrating means and said third article sensing means and being adapted to be opened and to inactivate said third vibrating means upon sensing of an article by said third sensing means.

11. Conveying apparatus according to claim 10 including a fourth control circuit, said fourth control circuit including said second vibrating means and said third article sensing means and being adapted to be opened upon sensing of an article by said third article sensing means, said second vibrating means being inactivated upon concurrent sensing of articles by both said second and third article sensing means.

12. Conveying apparatus according to claim 11 wherein said first, second and third article sensing means are microswitches.

References Cited in the file of this patent
UNITED STATES PATENTS

| | | |
|---|---|---|
| 2,675,120 | Autenrieth | Apr. 13, 1954 |
| 2,683,557 | Jenney | July 13, 1954 |
| 2,832,462 | Simer | Apr. 29, 1958 |